(12) United States Patent
Carnevali

(10) Patent No.: US 7,682,543 B2
(45) Date of Patent: Mar. 23, 2010

(54) METHOD FOR MANUFACTURING A WEIGHTED BASE

(76) Inventor: Jeffrey D. Carnevali, 5957 Beach Dr., SW., Seattle, WA (US) 98136

( * ) Notice: Subject to any disclaimer, the term of this patent is extended or adjusted under 35 U.S.C. 154(b) by 132 days.

(21) Appl. No.: 11/975,575

(22) Filed: Oct. 20, 2007

(65) Prior Publication Data

US 2009/0102091 A1   Apr. 23, 2009

(51) Int. Cl.
*B29C 45/14* (2006.01)
(52) U.S. Cl. .................. 264/255; 264/152; 264/163; 264/250; 248/346.06; 248/346.11; 248/910
(58) Field of Classification Search .......... 264/152, 264/163, 250, 255; 248/346.06, 346.11, 248/910
See application file for complete search history.

(56) References Cited

U.S. PATENT DOCUMENTS

| | | | |
|---|---|---|---|
| 855,149 A | 5/1907 | Vaugh et al. |
| 1,509,068 A | 9/1924 | Herron |
| 2,219,974 A | 10/1940 | Bellow |
| 2,806,131 A | 9/1957 | Palmer |
| 2,916,184 A | 12/1959 | Hartley et al. |
| 3,028,702 A | 4/1962 | St. Cyr |
| 3,312,436 A | 4/1967 | Beghetto, Jr. |
| 4,067,532 A | 1/1978 | Viteretto |
| 4,196,319 A | 4/1980 | Gates |
| 4,398,643 A | 8/1983 | Conlon |
| 4,788,916 A | 12/1988 | Saxton |
| D310,677 S | 9/1990 | Stidham, Jr. et al. |
| 4,964,600 A | 10/1990 | Lee |
| 5,350,147 A | 9/1994 | Paganus |
| D397,120 S | 8/1998 | Liou |
| 5,845,885 A | 12/1998 | Carnevali |
| 6,073,902 A | 6/2000 | Hiles |
| 6,220,556 B1 | 4/2001 | Sohrt et al. |
| 6,254,044 B1 | 7/2001 | Lee |
| 6,315,120 B1 | 11/2001 | Tally et al. |
| 6,328,271 B1 | 12/2001 | Haage et al. |
| 6,371,345 B1 | 4/2002 | Leyden et al. |
| 6,397,046 B1 | 5/2002 | Kfoury |
| 6,439,530 B1 | 8/2002 | Schoenfish et al. |

OTHER PUBLICATIONS

Advertisement: Garmin R Non-skid dash mount, Mfr. Cat. No. 010-10199-01 by the Science Company Store Dec. 5, 2001 at http://www.secure.sciencecompany.com.

*Primary Examiner*—Joseph S. Del Sole
*Assistant Examiner*—Stephen Sollenberger
(74) *Attorney, Agent, or Firm*—Charles J. Rupnick

(57) ABSTRACT

A method for manufacturing a weighted mounting platform, the method including: of a first injection moldable material, injection molding a substantially rigid body structure further comprising a substantially central hub with a plurality of legs projecting therefrom and an enlarged mass positioned adjacent to an end portion of at least two or more of the plurality of legs distal from the hub; of a second injection moldable material, injection molding a flexible skin covering at least a portion of the body structure between each enlarged mass and the central hub; and subsequent to the injection molding a flexible skin, freeing the enlarged mass positioned adjacent to an end portion of at least two or more of the plurality of legs for motion relative to the central hub.

18 Claims, 6 Drawing Sheets

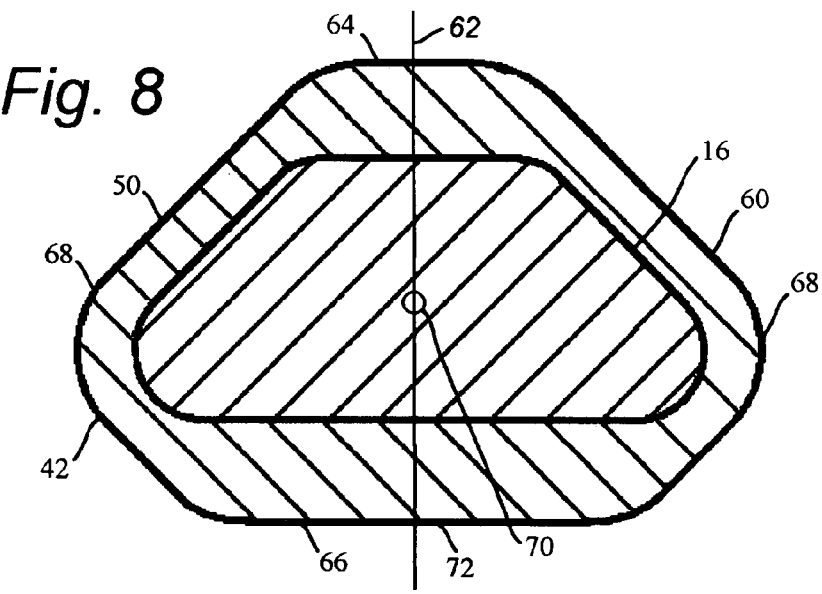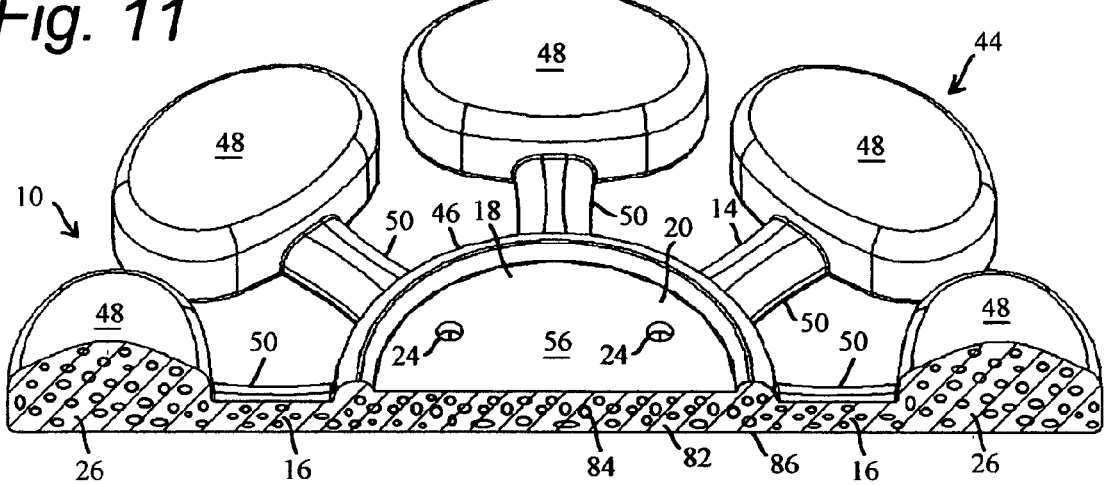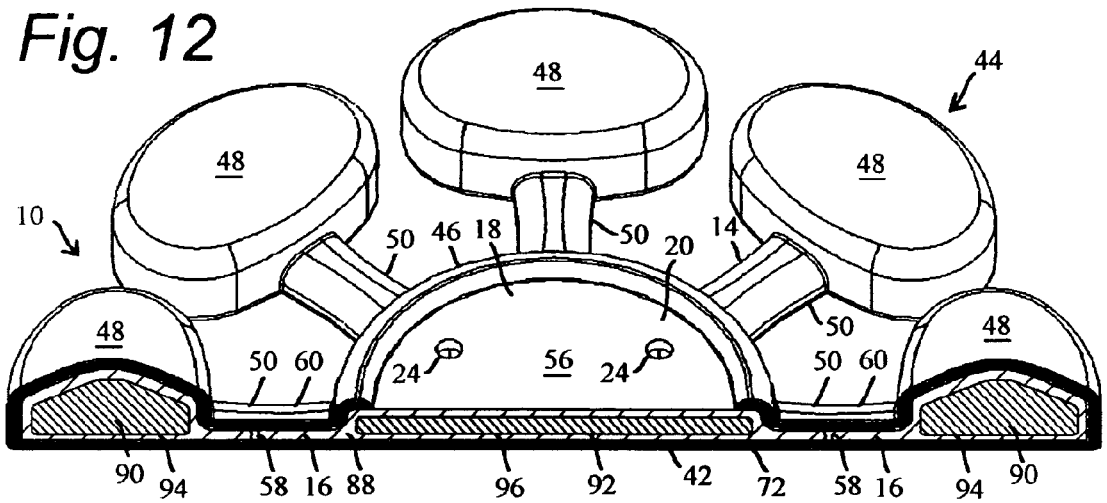

METHOD FOR MANUFACTURING A WEIGHTED BASE

FIELD OF THE INVENTION

The present invention relates generally to mounting platforms for supporting articles in an upright orientation relative to a non-planar surface, and in particular to weighted mounting platforms that are conformable to curving and other non-planar surfaces.

BACKGROUND OF THE INVENTION

Curving and other non-planar surfaces are common in many vehicles such as automobiles, boats, and airplanes. One example is the dashboard of an automobile, which typically resembles a series of hills and valleys formed by interconnected gently and steeply curving surfaces. Another example is the usually humped console between the bucket seats of an automobile. Often, the driver and passengers desire to place small articles such as coffee cups, cellular phone stands, and map holders on the vehicle dashboard or console. Unfortunately, the curving, non-planar nature of these and other surfaces is ill suited to the usually regular mounting surface common to most articles and to the stands and holders provided to support the less regular items.

Various clamps and brackets are known that are intended to be affixed to a surface of the vehicle using screws, adhesives, or suction cups. However, the first two lack portability, while the latter will not adhere to rough, cushioned, or fabric surfaces common in many automobiles. One solution is the "bean bag" base, an example of which is described in U.S. Pat. No. 4,964,600 entitled INSULATED CUP HOLDER WITH FLEXIBLE BASE MEMBER. This solution generally involves a flexible fabric pillow-shaped bag filled with a heavy granular material such as sand, gravel or lead shot. The stand, holder, coffee cup or other article is permanently attached to the bag so that the granular material surrounds it. The granular material generally conforms itself and the fabric bag to most non-planar surfaces, and its weight both holds the article upright and keeps it from sliding when the vehicle accelerates, brakes and turns. While not described here, many other examples of this very common technology are also known. Unfortunately, this bean bag technology generally requires the assembly of many pieces in multiple assembly steps.

Another solution is a monolithic weighted mounting platform formed of a heavy and malleable material such as a metallic material, for example, lead such as disclosed by the inventor of the present invention in U.S. Pat. No. 6,840,487 entitled WEIGHTED MOUNTING PLATFORM, which is incorporated in its entirety herein by reference. This solution provides a plurality of flexible legs extending radially from a common central hub, the legs and common central hub being integrally formed and having a lump of the heavy material each leg at ends thereof distal from the common central hub. A coating of elastomeric material is formed over substantially the entire surface of the flexible legs, the common central hub and the integrally formed masses. An attaching means is positioned at the common central hub for attaching a mounting device.

However, although less expensive to produce and more effective in operation than bean bag-type bases, even the monolithic weighted base is limited in its ability to provide the above function in an economically efficient manner.

SUMMARY OF THE INVENTION

The present invention is a novel weighted mounting platform having a weighted body structure formed of a web of easily breakable spider legs projected in a substantially radial web from a common large thick monolithic central hub having a substantially planar upper mounting surface. The novel weighted mounting platform is illustrated by example and without limitation as being formed with a plurality of eight of the breakable legs. According to one embodiment, the monolithic central hub is substantially round with the web of breakable legs radiating therefrom at regular intervals like spokes of a wheel. Alternatively, the central hub is formed in another shape such as a hexagon or octagon having straight sides with the individual legs of the web exiting either from near their centers, or alternatively from apexes where two adjacent sides meet.

According to one aspect of the novel weighted mounting platform, one or a plurality of fastener clearance holes are optionally formed in or through the central hub and present on the upper mounting surface. The weighted body structure is also formed with a plurality of substantially identical relatively heavy monolithic lumps or masses each positioned adjacent to an outer end of each of the radially projected breakable spider legs of the web and substantially uniformly spaced at regular intervals around the central hub. Each monolithic mass is further substantially enlarged relative to the breakable spider leg temporarily connecting it to the central hub.

The central hub, the web of breakable spider legs, and the plurality of enlarged monolithic end masses are integrally formed as one piece of a common relatively heavy high density injection moldable material, such as by example and without limitation a metal filled-plastic or filled-rubber material, or another high density injection moldable compound.

The radially projected spider legs are only intended to space each of the enlarged monolithic masses away from the central hub, and to function as in-gates in the mold for transferring injection molding material from the central hub to the enlarged end masses during the injection molding process when the injection molding material is introduced through a sprue into the central hub. Therefore, the spiders legs are severely necked-down before expanding into the substantially widened and thickened monolithic end masses at their outer ends distal from the central hub so as to be easily breakable at a later processing stage. The enlarged monolithic end masses are both significantly thicker and significantly wider than the breakable in-gate spider legs. In particular, the necked-down spider legs are intended to be broken, either in a later stage of production, or by the end user before use. Only when the spider legs are broken can the novel weighted mounting platform be used as intended for conforming to a non-planar surface because, until such time as the spider legs are broken, the weighted end masses at their outer ends are substantially rigidly connected in a substantially coplanar relationship with the central hub so as to be constrained from conforming to such a non-planar surface.

According to different aspects of the invention different methods are provided for manufacturing the novel weighted mounting platform.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 8 is a cross-section view of one breakable leg of the novel weighted mounting platform;

FIG. 11 is a cross-section view that illustrates by example and without limitation optional one alternative embodiment of the weighted mounting platform;

FIG. 12 is a cross-section view that illustrates by example and without limitation optional another alternative embodiment of the weighted mounting platform.

DETAILED DESCRIPTION OF PREFERRED EMBODIMENT

In the Figures, like numerals indicate like elements.

Figure 1:
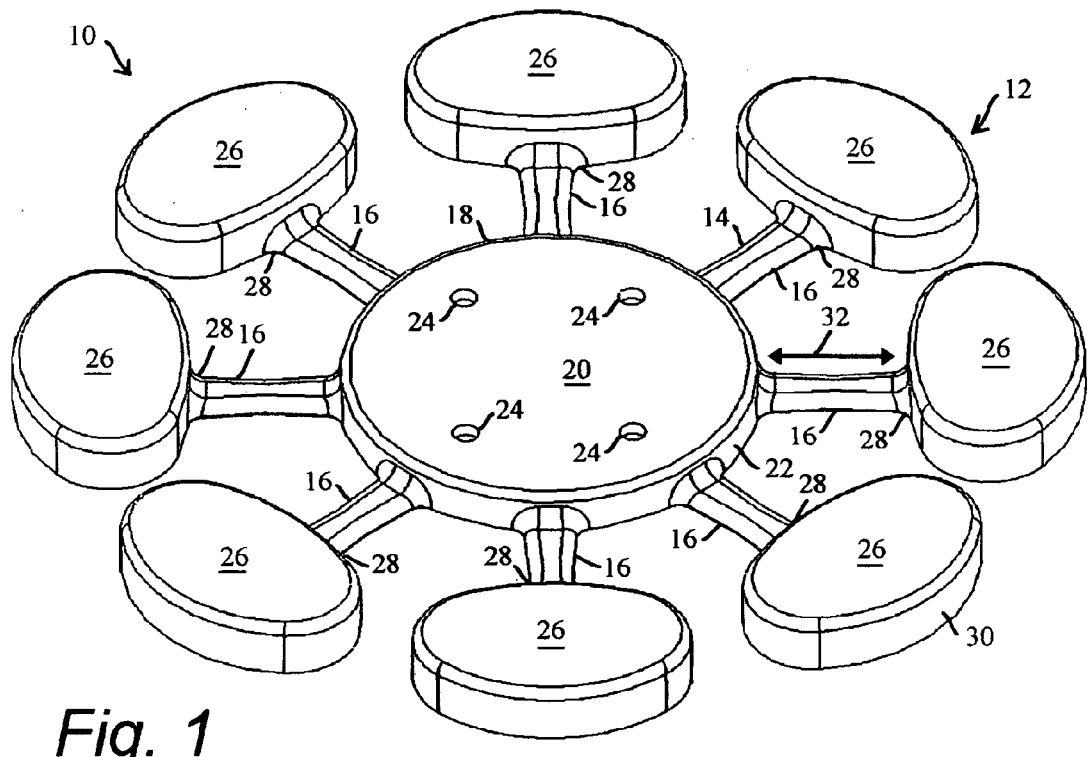
FIG. 1 is a top perspective view showing an example of a weighted body structure portion of a novel weighted mounting platform of the present invention that is conformable to a non-planar surface.

FIG. 1 is a top perspective view of the present invention illustrated by example and without limitation as a weighted mounting platform 10 conformable to a non-planar surface. The weighted mounting platform 10 includes weighted body structure 12 formed of a web 14 of easily breakable spider legs 16 projected in a substantially radial web from a common large thick monolithic central hub 18 having a substantially planar upper mounting surface 20. The weighted mounting platform 10 is illustrated here by example and without limitation as being formed with a plurality of eight of the breakable legs 16 forming the web 14. According to one embodiment, the monolithic central hub 18 is substantially round with the web 14 of breakable legs 16 radiating from sides 22 thereof at regular intervals like spokes of a wheel. Alternatively, the central hub 18 is formed in another shape such as a hexagon or octagon having straight sides with the individual legs 16 of the web 14 exiting either from near their centers, or alternatively from apexes where two adjacent sides meet. Accordingly, other non-round shapes are also contemplated for the monolithic central hub 18 and may be substituted without deviating from the scope and intent of the present invention.

One or a plurality of fastener clearance holes 24 are optionally formed in or through the central hub 18 and present on the upper mounting surface 20. The weighted body structure 12 is also formed with a plurality of substantially identical relatively heavy monolithic lumps or masses 26 each positioned adjacent to an outer end 28 of each of the radially projected breakable spider legs 16 of the web 14 and substantially uniformly spaced at regular intervals around the central hub 18. Each monolithic mass 26 is further substantially enlarged relative to the breakable spider leg 16 temporarily connecting it to the central hub 18.

The central hub 18, the web 14 of breakable spider legs 16 and the plurality of enlarged monolithic end masses 26 are integrally formed as the weighted body structure 12 in one solitary and monolithic piece of a common relatively heavy high density injection moldable material 30, such as by example and without limitation a metal filled-plastic or filled-rubber material, or another high density injection moldable compound. Injection molding the weighted body structure 12 also results in the upper mounting surface 20 of the monolithic central hub 18 having a substantially planar surface with a substantially smooth finish.

The radially projected spider legs 16 are only intended to space each of the enlarged monolithic masses 26 a substantially identical distance 32 away from the central hub 18, and to function as in-gates in the mold for transferring injection molding material 30 from the central hub 18 to the enlarged end masses 26 during the injection molding process when the injection molding material 30 is introduced through a sprue into the central hub 18. Therefore, the spiders legs 16 are severely necked-down before expanding into the substantially widened and thickened monolithic masses 26 at their outer ends 28 distal from the central hub 18 so as to be easily breakable at a later processing stage. The enlarged monolithic masses 26 are both significantly thicker and significantly wider than the breakable in-gate spider legs 16. In particular, the necked-down spider legs 16 are intended to be broken, either in a later stage of production, or by the end user before use. Only when the spider legs 16 are broken can the weighted mounting platform 10 be used as intended for conforming to a non-planar surface because, until such time as the spider legs 16 are broken, the weighted masses 26 at their outer ends 28 are substantially rigidly connected in a substantially coplanar relationship with the central hub 18 so as to be constrained from conforming to such a non-planar surface.

Figure 2:
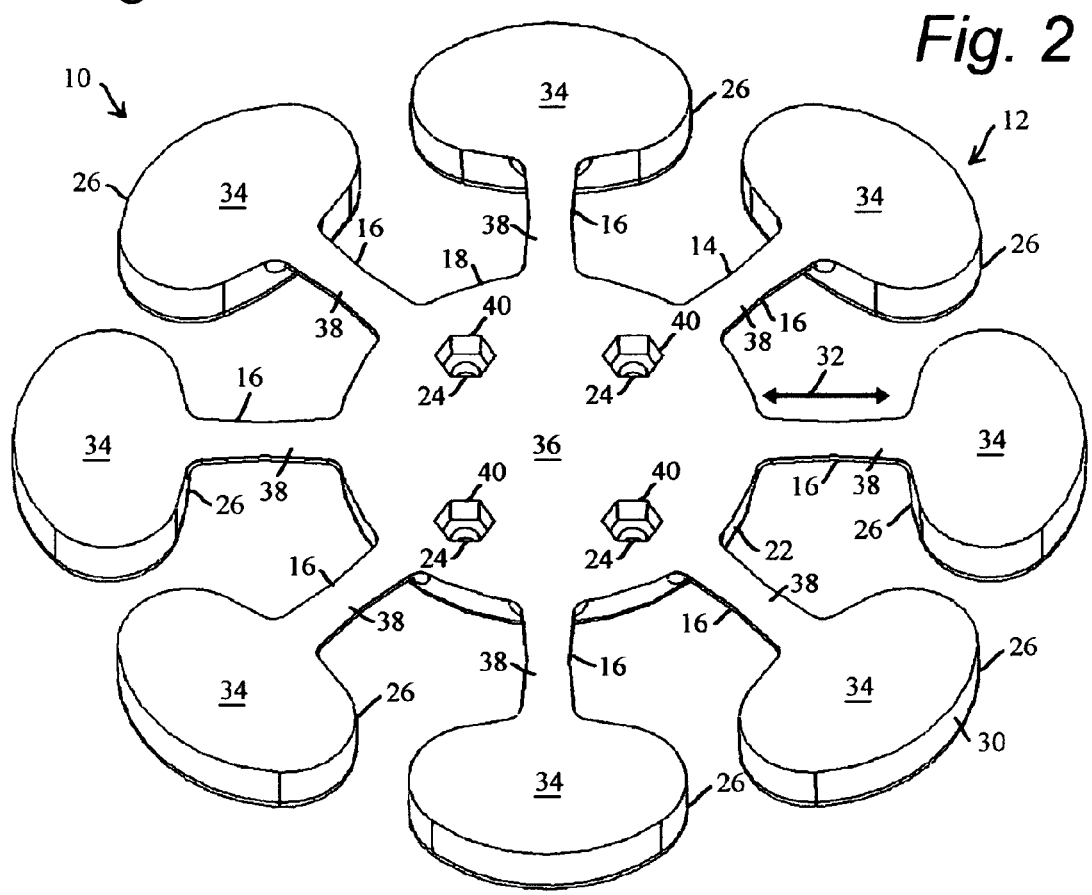
FIG. 2 is a bottom perspective view of the weighted body structure portion of the novel weighted mounting platform.

FIG. 2 illustrates the weighted body structure 12 of the mounting platform 10, wherein the attached enlarged monolithic end masses 26 are illustrated having respective base surfaces 34. The base surfaces 34 of the respective monolithic masses 26 are illustrated here by example and without limitation as being formed substantially coplanar with a base surface 36 of the monolithic central hub 18. Optionally, the narrow breakable legs 16 connecting the monolithic end masses 26 to the central hub 18 have respective base surfaces 38 that also may be substantially coplanar with the base surfaces 34 and 36 of the respective end masses 26 and central hub 18. Else, the base surfaces 38 of the breakable legs 16 are spatially non-coplanar with the respective base surfaces 34 and 36 of the end masses 26 and central hub 18. For example, the relatively narrow breakable legs 16 optionally exit the central hub 18 adjacent to the upper mounting surface 20 thereof, else between the base and upper mounting surfaces 36 and 21, all such configurations of the weighted mounting platform 10 having the narrow breakable legs 16 connected in different relationships between the respective end masses 26 and central hub 18 are considered to be equivalent and may be substituted without deviating from the scope and intent of the present invention. In any configuration, the breakable legs 16 are intended to support and position the respective end masses 26 relative to the central hub 18 during one or more successive processing steps, yet be breakable at a later stage.

As illustrated here by example and without limitation, recesses 40 are optionally formed into the base surface 36 of the central hub 18 substantially concentric with corresponding fastener clearance holes 24 to receive a head of a fastener. For example, the recesses 40 are of a square or hexagonal (shown) shape and sized appropriately to cooperate with the fastener clearance holes 24. The recesses 40 may be 12-pointed stars to receive either a square or hex-shaped fastener head. Alternatively, the recesses 40 are round and sized large enough to receive a socket around the fastener head.

Figure 3:
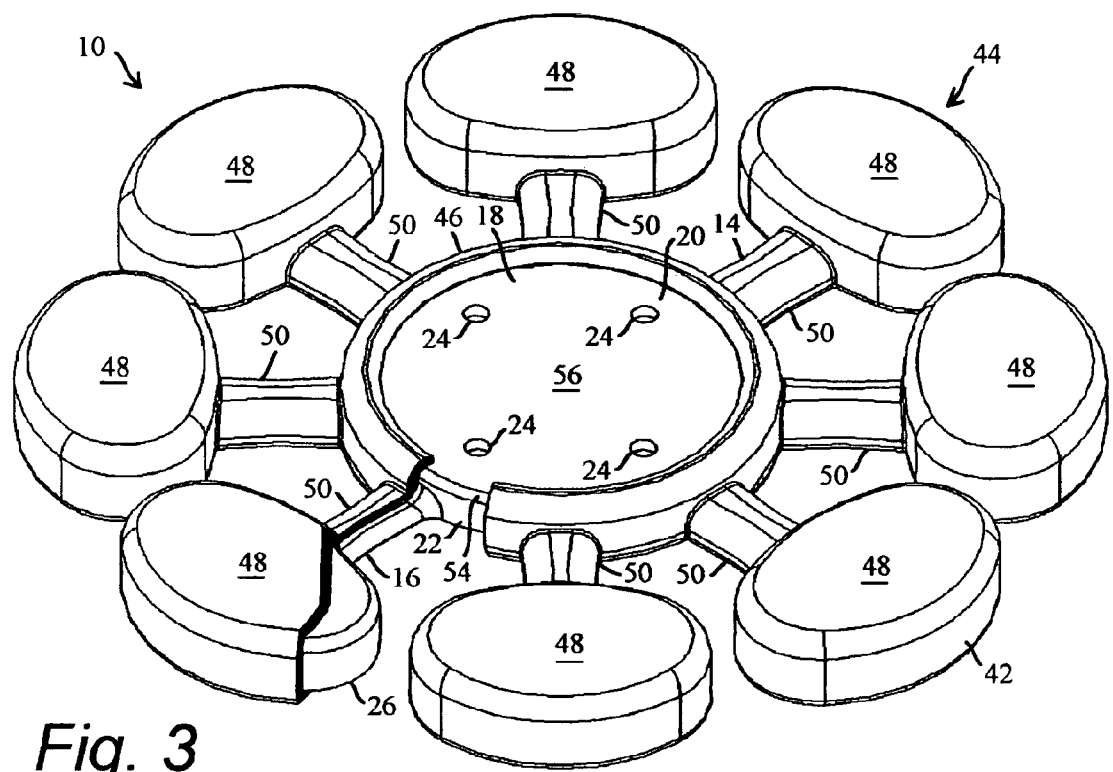
FIG. 3 is a top perspective view showing an example of the novel weighted mounting platform of the present invention that is conformable to a non-planar surface.
Figure 4:
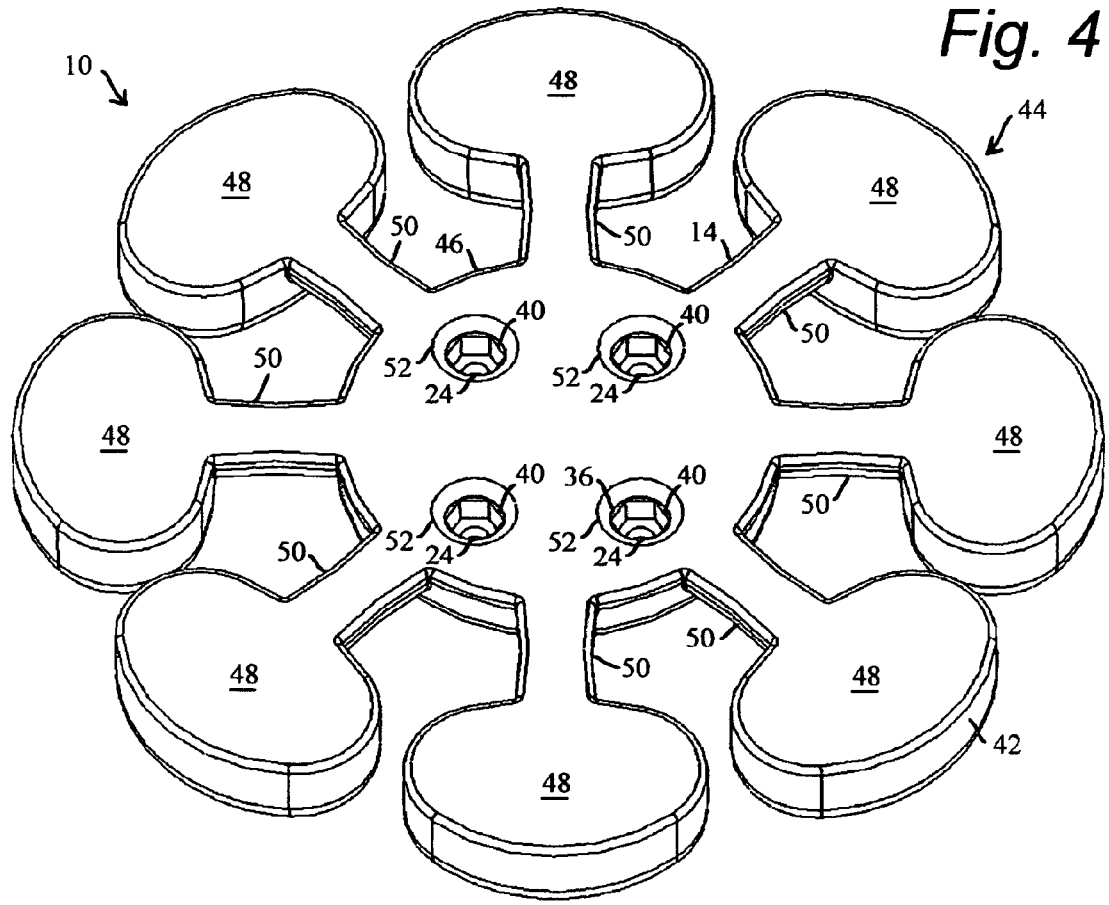
FIG. 4 is a bottom perspective view showing an example of the novel weighted mounting platform of the present invention that is conformable to a non-planar surface.

FIG. 3 and FIG. 4 illustrate the weighted mounting platform 10, wherein the components of the weighted body structure 12: the central hub 18, the monolithic end masses 26 and the respective interconnecting breakable legs 16, are overmolded with a monolithic and substantially uniform external coating or sheath 42 of a soft rubber or other flexible elastomeric material. The overcoated or overmolded weighted mounting platform 10 thus includes an overcoated or overmolded weighted body structure 44 having an at least partially overcoated or overmolded central hub 46 and a plurality of substantially completely overcoated or overmolded end masses 48 on respective substantially completely overcoated or overmolded interconnecting legs 50.

As illustrated by example and without limitation, the coating 42 smoothly covers the enlarged end masses 26 and the entire web 14 of narrow connecting legs 16. The coating also covers the sides 22 of the monolithic central hub 18 and most of the base surface 36, except for small apertures 52 therethrough for exposing the recesses 40 corresponding to the different fastener clearance holes 24. The coating 42 on the central hub 18 extends along the sides 22 and over a peripheral lip portion 54 of the substantially planar upper mounting surface 20. The monolithic coating 42 thus smoothly covers the central hub 18 except large and substantially planar central portion 56 of the upper mounting surface 20, which includes the fastener clearance holes 24.

Figure 5:
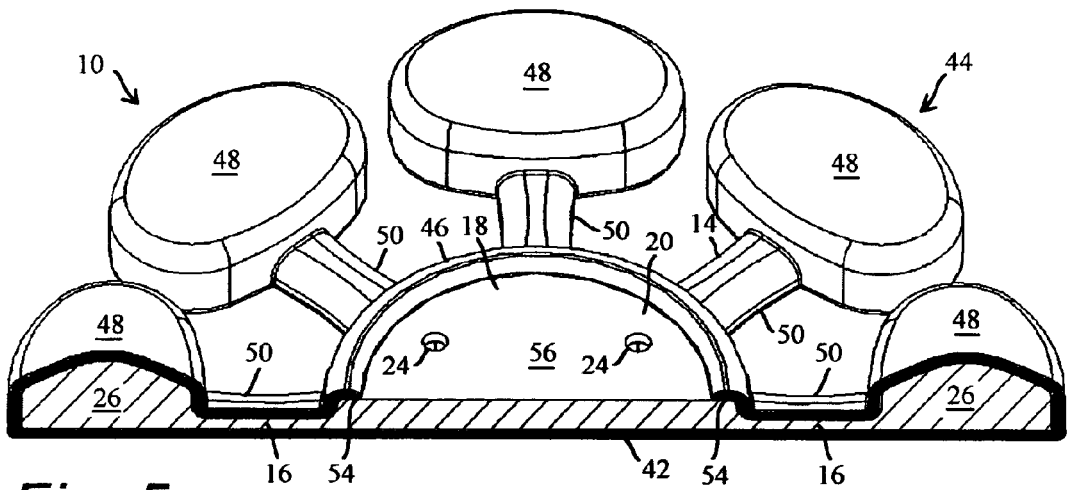
FIG. 5 is a cross section view showing an example of the novel weighted mounting platform.

FIG. 5 is a cross section view of the weighted mounting platform 10 taken through the central hub 18, the monolithic end masses 26, two of the relatively narrow temporary interconnecting legs 16 of the weighted body structure 12, and the overmolded coating 42. This view more clearly illustrates the coplanarity of the respective base surfaces 34 and 36 of the end masses 26 and central hub 18, as well as the base surfaces 38 of the respective connecting legs 16. This view also illustrates the substantially planar central portion 56 of the upper mounting surface 20 being exposed by the coating 42.

Figure 6:
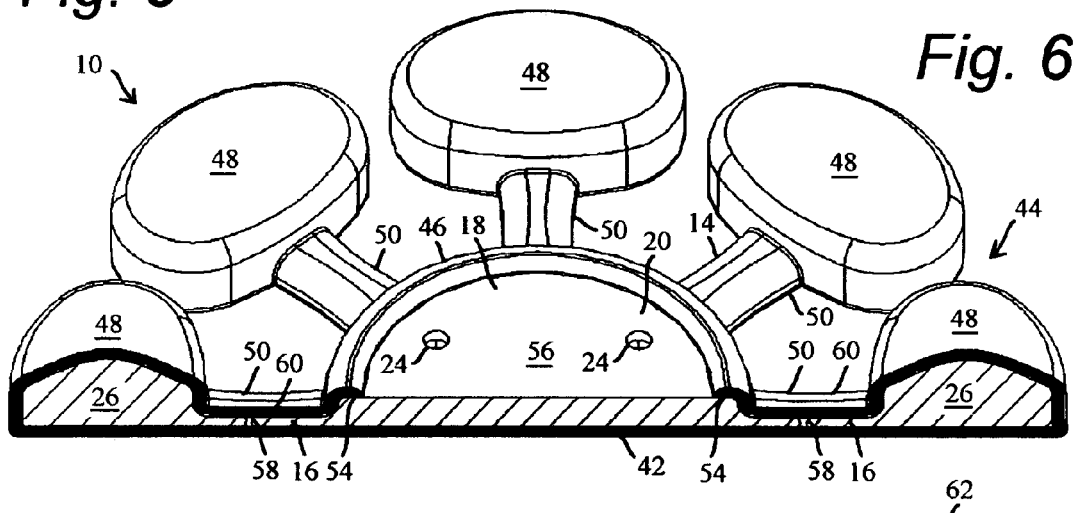
FIG. 6 illustrates by example and without limitation a step of a process for making the novel weighted mounting platform.

FIG. 6 illustrates by example and without limitation a step of the process required to make the weighted mounting platform 10 conformable to a non-planar surface. Here, a break 58 is caused in each of the connecting legs 16 for freeing the monolithic end masses 26 from their substantially coplanar relationship with the central hub 18 heretofore being rigidly maintained by the web 14 of substantially rigid connecting legs 16, which relationship effectively constrained the weighted mounting platform 10 from conforming to such a non-planar surface. The break 58 is optionally positioned anywhere along the connecting leg 16 between the central hub 18 and the respective end mass 26. Accordingly, the weighted body structure 12 is converted from a monolithic structure to its components: the central hub 18 surrounded by an array of tethered satellite weighted masses 26 floating at the ends of a tubular web portion 60 of the elastomer coating 42 sheathing the respective broken legs 16.

Figure 7:
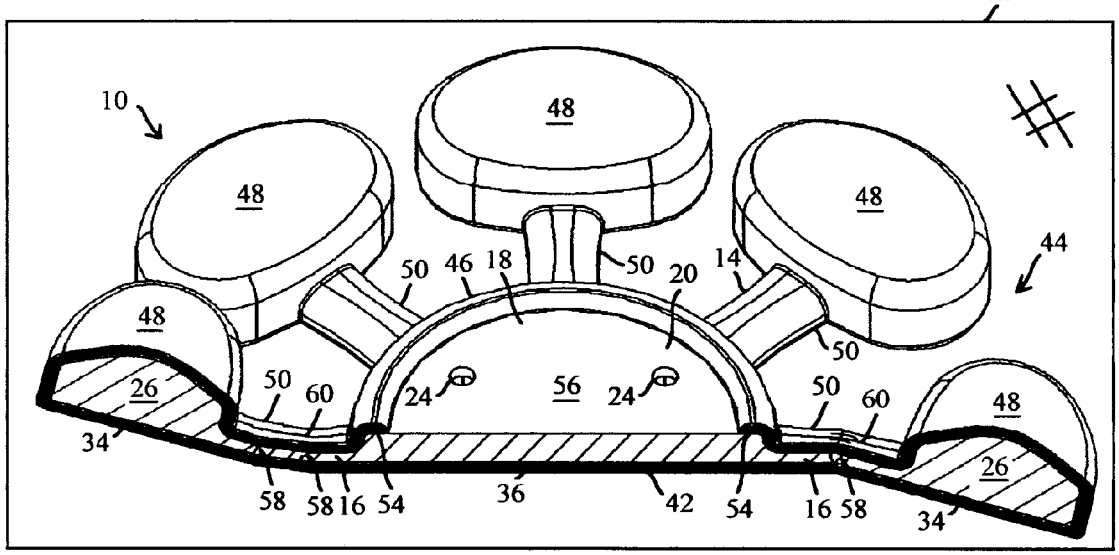
FIG. 7 illustrates by example and without limitation operation of the novel weighted mounting platform.

FIG. 7 illustrates by example and without limitation operation of the weighted mounting platform 10 being conformable to a non-planar surface. Here, the breaks 58 in the respective legs 16 permit the corresponding weighted masses 26 of the weighted body structure 12 to dislocate from their heretofore planar relationship with the heavy central hub 18. For example, as illustrated here by example and without limitation, the weighted masses 26 shown on the page to the left and right of the central hub 18 are dislocated respectively up and down from the plane of the central hub's base surface 36.

Optionally, as illustrated by example and without limitation on the left, the one or more of the connecting legs 16 is broken in multiple places to cause multiple breaks 58 between the heavy central hub 18 and the corresponding weighted masses 26. The multiple breaks 58 in the connecting leg 16 maximizes conformability of the weighted mounting platform 10 to a non-planar surface.

The one or more breaks 58 remove each leg 16 as a connecting member between the central hub 18 and the corresponding weighted masses 26. After one or more breaks 58 are introduced, the respective legs 16 of the web 14 are broken and no longer perform the two functions of retaining the coplanar relationships of the respective base surfaces 34 of the end masses 26 with the base surface 36 of the central hub 18, and connecting the respective end masses 26 with the central hub 18. The function of maintaining the coplanar relationship is completely eliminated by introduction of the breaks 58 into the legs 16. However, the connecting function heretofore served by the legs 16 is hereafter provided instead by the web portion 60 of the elastomer coating 42 sheathing the respective broken legs 16.

The coating 42 is, for example, a flexible elastomeric material such as rubber, plastic, urethane, latex, vinyl or polyvinyl, or another suitable elastomeric material that contains the debris of the broken legs 16, while permitting the corresponding weighted end masses 26 to move substantially freely at least in a plane 62 substantially perpendicular of the respective base surfaces 34 and 36 of the end masses 26 and central hub 18 independently of both the central hub 18 and other end masses 26. The freedom to move substantially perpendicular of the respective base surfaces 34 and 36 permits the web 14 to conform to a non-planar mounting surface, which permits the weighted platform 10 to function in the intended manner. Optionally, the web portion 60 of the elastomer coating 42 also stiffens the web 14 against motion outside of the perpendicular plane 62. For example, the web portion 60 of the elastomer coating 42 is configured to be much wider crosswise of the perpendicular plane 62 than therewithin.

FIG. 8 is a cross-section view of one of the overcoated or overmolded interconnecting legs 50 typical of the overcoated or overmolded weighted body structure 44, wherein one breakable leg 16 typical of the web 14 is illustrated by example and without limitation as being encased in the tubular web portion 60 of the elastomeric coating 42. Here, the tubular web portion 60 of the coating 42 around the breakable leg 16 is configured having an upper thickness 64 and/or a lower thickness 66 thicker than side thicknesses 68. The thicker upper and/or lower thicknesses 64 and 66 are oriented crosswise of the perpendicular plane 62. Such crosswise orientation causes the thicker upper and/or lower thicknesses 64 and 66 of the web portion 60 of the coating 42 to effectively stiffen the web 14 against motion outside of the perpendicular plane 62, while the thinner side thicknesses 68 permit easy motion within the plane 62. As illustrated here, the thinner side thicknesses 68 may be inclined relative to the perpendicular plane 62 for encouraging even easier in-plane motion of the coating web portion 60. Accordingly, the weighted masses 26 more easily on the web portion 60 of the coating 42 within the perpendicular plane 62 after the connecting legs 16 are broken; yet the upper and/or lower thicknesses 64 and 66 of the web portion 60 of the coating 42 keep the weighted masses 26 substantially uniformly distributed about the central hub 18. The upper and/or lower thicknesses 64 and 66 also limit twisting of the web portion 60 of the coating 42 about the longitudinal axis 70 of the respective leg 16 for constraining the base surfaces 34 of the respective weighted masses 26 to remain substantially parallel with the central hub's base surface 36.

Optionally, the coating 42 is formed of a low durometer, rubbery material with an outer surface 72 having a relatively high coefficient of friction. Thus, the coating 42 is a pliable material having a low hardness, for example, in the range of 30 to 40 Shore D and a slightly viscous "tacky" or "sticky" non-skid surface 72 that tends to resist sliding when placed in weighted contact with typical vehicle upholstery and cab or cockpit finish materials such as vinyl, leather, cloth, glass, anodized or painted aluminum, and fiberglass.

The tendency to resist sliding is reinforced by the shallow apertures 52 formed in the coating 42 on the bottom surface of the weighted platform 10 for exposing the recesses 40 corresponding to the different fastener clearance holes 24, as shown in FIG. 4. Additional ones of the shallow apertures 52 are optionally formed in the coating 42 covering the base surface 36 of the central hub 18. The shallow apertures 52 are also optionally provided in a pattern in the coating 42 covering the base surface 34 of one or more of the weighted masses 26.

In practice the sheath or coating 42, commonly known as an overmold, is applied during a molding process, for example, an injection molding process. During such a process the portions of the weighted body structure 12 to be coated, i.e., the weighted masses 26, the central hub 18 and the legs 16 of the web 14, are positioned in one side of a heated mold die, a second side of the die is closed over the portions to be coated, and a stream of liquid coating material is injected under pressure into the closed die. Usually, the coating 42 is formed of a thermosetting substance or a thermoplastic resin that sets quickly in the heated die. The die is opened and the thoroughly coated weighted platform 10 is ejected. Installation of the hub 18 and weighted masses 26 into the die is greatly simplified because these parts are initially integrally formed as the monolithic body structure 12 being interconnected by the web 14 of breakable legs 16, as by injection molding. Also, the relative positions of the parts within the die cavity are better maintained because the weighted body structure 12 is integrally formed as a monolithic structure.

For example, the integrally formed monolithic weighted body structure 12 is fixed within the injection molding die. Complete and uniform disposal of the coating 42 over the exterior of the weighted body structure 12 is assured only when the web 14 of legs 16, end masses 26 and central hub 18 portions are accurately positioned relative to the interior of the die leaving a predetermined spacing between the parts of the weighted body structure 12 and the interior surfaces of the mold die, and those positions are maintained during the high pressure introduction of the coating material into the die cavity. Such means for positioning the weighted body structure 12 and maintaining such position are well known in the art, as disclosed by example and without limitation in U.S. Pat. No. 6,840,487, which is incorporated in its entirety herein by reference. During the molding process the liquid coating material is injected under pressure into the die through a gate (not shown) formed in the die central to the hub portion 15 and located opposite the upper surface of the weighted body structure 12. Thus, the pressure of the injected liquid serves to force the weighted body structure 12 downwardly toward the bottom surface of the die. Locating pins may be utilized for holding the base surfaces 34 and 36 of the respective end masses 26 and central hub 18 spaced away from the bottom interior surface of the die. This spacing provides the uniform thickness of the coating 42 on the bottom of the weighted body structure 12, and furthermore, provides the uniform thickness of the coating 42 over the remainder of the weighted body structure 12, except as modified by design.

Alternatively, as taught by U.S. Pat. No. 6,840,487, which is incorporated in its entirety herein by reference, one or a quantity of spacers may be projected from the bottom of the weighted body structure 12, for example, from the base surfaces 34 and 36 of each of the respective end masses 26 and central hub 18. The spacers are optionally integrally formed in the weighted body structure 12 during the injection molding thereof and eliminate the need for uniformity of length among different locating pins between different injection mold dies and between different locating pins within a single die. The lengths of different projecting spacers may be more easily controlled than the depth of locating holes due to the nature of the injection molding process. Widely separating a quantity of spacers in a pattern such as a circle, rectangle or triangle furthermore eliminates any tendency of the weighted body structure 12 to tip during the overmolding operation.

Generally, unless otherwise provided for, the injection molded surface of the weighted body structure 12 is substantially smooth and may lack sufficient texture for securely maintaining adhesion between the outer surfaces thereof and the overmolded coating 42. Extended use and multiple expansions and contractions due to uncontrolled temperature variations may eventually partially or wholly sever the initial adhesion. Thus, downwardly projecting spacers further provide a quantity of anchors for fixing the position of the coating 42 relative to the base surfaces 34 and 36 of each of the respective end masses 26 and central hub 18 of the weighted body structure 12.

The legs 16 connecting the respective end masses 26 and central hub 18 are broken within the tubular web portion 60 of the elastomer coating 42 sheathing the respective broken legs 16. The one or more break 58 are caused in each of the connecting legs 16 by snapping the narrow section between the respective end masses 26 and central hub 18. The weighted monolithic end masses are thus freed from their constrained substantially coplanar relationship with the central hub 18 of the weighted body structure 12. The one or more breaks 58 convert the weighted body structure 12 from a monolithic structure to its component parts: the central hub 18 surrounded by an array of tethered satellite weighted masses 26 floating at the ends of the respective tubular web portions 60 of the elastomer coating 42 sheathing the respective now-broken legs 16.

Thereafter, the greater volume the enlarged monolithic masses 26 causes them to be heavy enough to operate to effectively hold the entire weighted mounting platform 10 in whatever position it is placed. Thus, when placed on a curving or non-planar surface such as a automobile dashboard or console, the now-broken legs 16 conform to the hills and valleys, while the weightier monolithic end masses 26 provide sufficient inertia to maintain the weighted mounting platform 10 in position against the tendency to slip and slide when the vehicle accelerates, brakes or turns.

Figure 9:
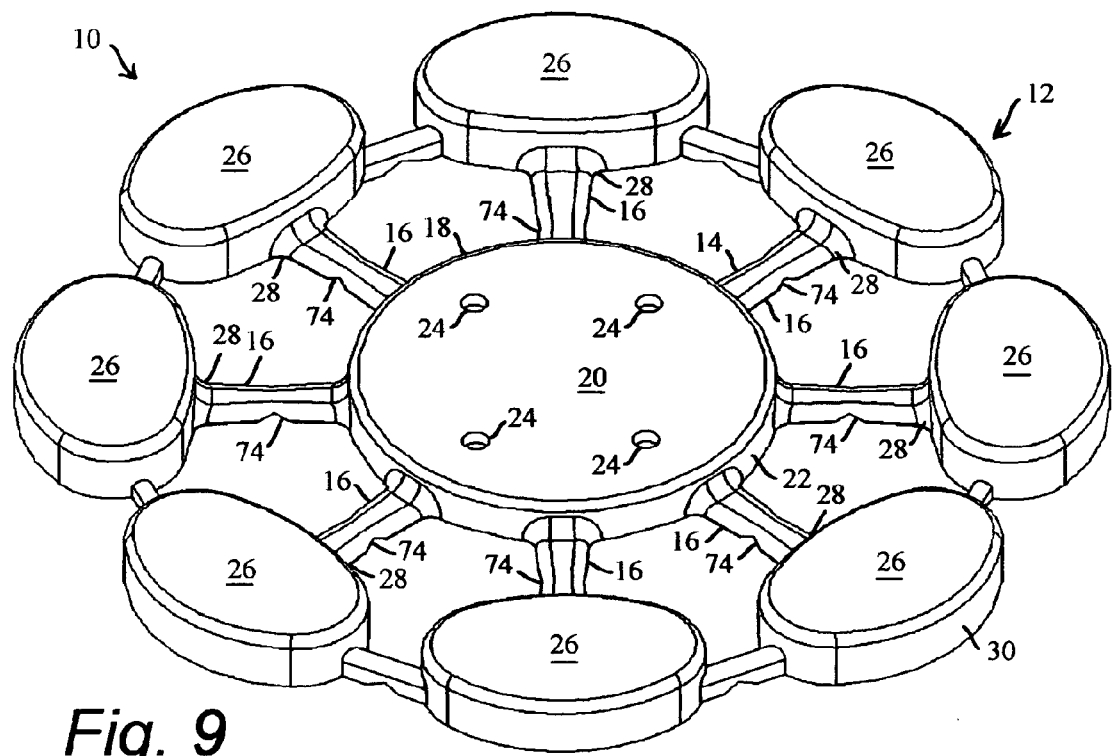
FIG. 9 is a top perspective view that illustrates by example and without limitation optional stress concentration features that may be formed in the connecting legs of the weighted body structure portion of the novel weighted mounting platform.
Figure 10:
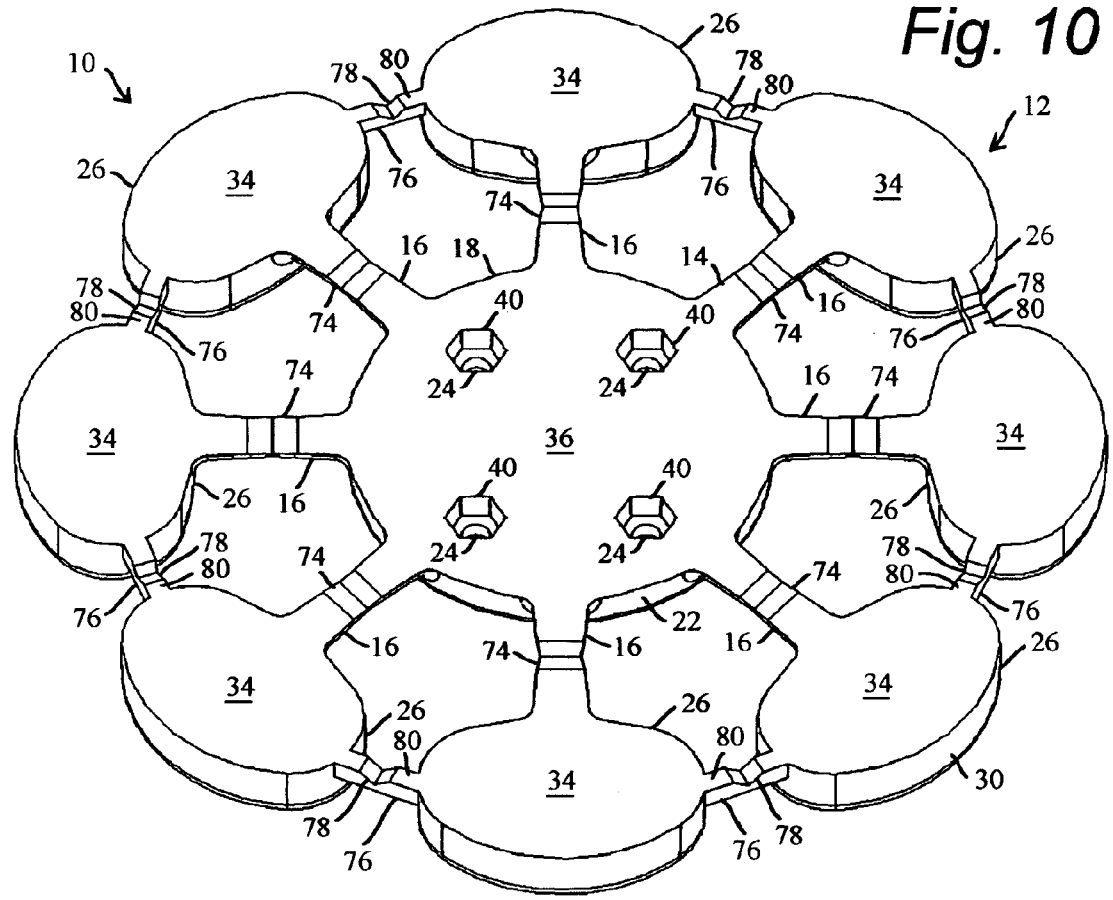
FIG. 10 is a bottom perspective view that illustrates by example and without limitation the optional stress concentration features that may be formed in the connecting legs of the weighted body structure portion of the novel weighted mounting platform.

FIG. 9 and FIG. 10 are respective top and bottom perspective views that illustrate by example and without limitation optional stress concentration features 74 that may be formed in the connecting legs 16 during the injection molding process forming the monolithic weighted body structure 12. Such stress concentration features 74 aid in forming the one or more breaks 58 in the connecting legs 16 that free the end masses 26 from their coplanar relationship with the central hub 18.

Here for example, the stress concentration features 74 are provided by shallow notches formed in the base surfaces 38 of the connecting legs 16. The stress concentration notches 74 both ensure the one or more breaks 58 will occur in a predetermined location within the legs 16, and improve breakability of the legs 16. Here, by example and without limitation, the stress concentration notches 74 are formed as V-shaped notches, but are optionally of a different shape. Also, the stress concentration notches 74 are illustrated here by example and without limitation as being located approximately intermediately between the central hub 18 and the array of satellite weighted masses 26. Furthermore, while a single stress concentration notch 74 is illustrated here in each leg 16, it will be readily understood that a plurality of the stress concentration notches 74 are optionally provided in each leg 16 as to produce the multiple breaks 58 in one or more of the legs 16 illustrated herein.

As also illustrated here by example and without limitation, the monolithic weighted body structure 12 optionally includes a chain of fingers 76 interconnecting the satellite weighted masses 26. When present, the optional chain of interconnecting fingers 76 function as in-gates in the mold for transferring molding between the enlarged end masses 26 during the injection molding process when the injection molding material 30 is introduced through a sprue into the central hub 18 so as to ensure uniform filling of the mold cavities. The interconnecting fingers 76 also function to substantially uniformly space adjacent monolithic masses 26 at regular intervals around the central hub 18.

The fingers 76 substantially rigidly interconnect the weighted masses 26 in a substantially coplanar relationship with one another in a ring around the central hub 18 so as to be constrained from conforming to such a non-planar surface. Therefore, the interconnecting fingers 76 are severely necked-down before expanding into the substantially widened and thickened monolithic masses 26 connected thereto so as to be easily breakable at a later processing stage. The enlarged monolithic masses 26 are both significantly thicker and significantly wider than the breakable in-gate fingers 76. In particular, the necked-down fingers 76 are intended to be broken, either in a later stage of production, or by the end user before use. Only when the interconnecting fingers 76 are broken can the weighted mounting platform 10 be used as intended for conforming to a non-planar surface because, until such time as the interconnecting fingers 76 are broken, the weighted masses 26 are substantially rigidly interconnect in a substantially coplanar relationship with one another in a ring around the central hub 18 so as to be constrained from conforming to such a non-planar surface.

Optionally, as illustrated here by example and without limitation, stress concentration features 78 may be formed in the connecting fingers 76 during the injection molding process forming the monolithic weighted body structure 12. Such stress concentration features 78 aid in breaking the connecting fingers 76 for freeing the end masses 26 from their coplanar relationship with one another.

Here for example, the stress concentration features 78 are provided by shallow notches formed in base surfaces 80 of the connecting fingers 76. The stress concentration notches 78 both ensure one or more of the breaks 58 will occur in a predetermined location within the fingers 76, and improve breakability of the fingers 76. Here, by example and without limitation, the stress concentration notches 78 are formed as V-shaped notches, but are optionally of a different shape. Also, the stress concentration notches 78 are illustrated here by example and without limitation as being located approximately intermediately between the adjacent satellite weighted masses 26. Furthermore, while a single stress concentration notch 78 is illustrated here in each finger 76, it will be readily understood that a plurality of the stress concentration notches 78 are optionally provided in each finger 76 as to produce a multiple of the breaks 58 in one or more of the fingers 76 illustrated herein.

FIG. 11 is a cross-section view that illustrates by example and without limitation optional one alternative embodiment of the weighted mounting platform 10 conformable to a non-planar surface. Here, the weighted mounting platform 10 is formed of a heavy high density injection moldable filled-rubber or other flexible filled-elastomeric material 82. For example, the injection moldable elastomer material 82 filled with metal or another high density material 84, such as stone or glass. By example and without limitation, the high density material 84 is provided, by example and without limitation, in the form of beads, chips or flakes. The high density material 84 is optionally mixed with the injection moldable rubber or other elastomeric material 82 prior to introduction into the mold, else it is introduced into the mold separately. The rubber or other elastomeric material 82 is injection molded to form the weighted body structure 12. The rubber or other elastomeric material 82 causes narrow connecting legs 16 to be relatively flexible for conforming the weighted mounting platform 10 to non-planar surface. The heavy filler material 84 causes the enlarged end masses 26 and the monolithic central hub 18 to be relatively heavy for holding the weighted mounting platform 10 firmly in place. The heavy filler material 84 also causes the enlarged end masses 26 and, in particular, the monolithic central hub 18 to be relatively rigid for effectively forming the substantially planar central portion 56 of the upper mounting surface 20.

The rubber or other elastomeric material 82 also forms a skin that provides the coating or sheath 42 over the weighted body structure 12, as well as providing the non-skid surface 72 having a relatively high coefficient of friction that tends to resist sliding in operation. For example, the elastomeric material 82 is optionally formed of a low durometer, rubbery material with an outer surface 86 having a relatively high coefficient of friction. Therefore, a secondary operation for molding the coating 42 over the weighted body structure 12 is eliminated with commensurate savings.

FIG. 12 is a cross-section view that illustrates by example and without limitation optional another alternative embodiment of the weighted mounting platform 10 conformable to a non-planar surface. Here, the weighted mounting platform 10 is formed of the weighted body structure 12 having the central hub 18, the end masses 26, and the relatively narrow temporary interconnecting legs 16 all formed of a conventional injection moldable plastic material 88. Here, weight is provided in the end masses 26 by heavy end mass inserts 90 positioned adjacent to the outer end 28 of each of the radially projected breakable spider legs 16 of the web 14. The weighted inserts 90 are formed, for example, of a heavy metal such as lead, or another heavy non-metallic material such as gel, glass or earth. The weighted inserts 90 are optionally either monolithic lumps or masses, else a grouping of a plurality of smaller individual lumps or masses, such as stacks of thinner sheets of heavy material. Alternatively, the weighted inserts 90 are sacks containing a plurality of heavy beads or a quantity of heavy gel.

Optionally, a heavy central hub insert 92 is positioned within the central hub portion 15 of the weighted body structure 12.

The weighted end mass inserts 90 and central hub insert 92, when present, are placed in the mold prior to injection thereinto of the injection moldable plastic material 88. For example, the weighted end mass inserts 90 and central hub insert 92 are fixed within the injection molding die in the positions of each of the end masses 26 and the central hub portion 15, respectively. Complete and uniform disposal of the injection moldable plastic material 88 over the exterior of the weighted inserts 90, 92 during injection molding of the weighted body structure 12 is assured only when the weighted inserts 90, 92 are accurately positioned relative to the interior of the die leaving a predetermined spacing between the parts of the weighted inserts 90, 92 and the interior surfaces of the mold die, and those positions are maintained during the high pressure introduction of the coating material into the die cavity. Such means for positioning the weighted inserts 90, 92 and maintaining such position are well known in the art, as disclosed by example and without limitation in U.S. Pat. No. 6,840,487, which is incorporated in its entirety herein by reference. During the molding process the liquid injection moldable plastic material 88 is injected under pressure into the die through a gate (not shown) formed in the die central to the hub portion 15 and located opposite the upper surface of the weighted body structure 12. Thus, the pressure of the injected liquid serves to force the weighted inserts 90, 92 downwardly toward the bottom surface of the die. Locating pins may be utilized for holding base surfaces 94 and 96 of the respective weighted end mass inserts 90 and central hub insert 92 spaced away from the bottom interior surface of the die. This spacing provides the uniform thickness of the injection moldable plastic material 88 on the bottom of the weighted inserts 90, 92, and furthermore, provides the uniform thickness of the injection moldable plastic material 88 over the remainder of the weighted inserts 90, 92, except as modified by design.

Alternatively, as taught by U.S. Pat. No. 6,840,487, which is incorporated in its entirety herein by reference, one or a quantity of spacers may be projected from the bottom of the weighted end mass inserts 90 and central hub insert 92, for example, from the base surfaces 94 of each of the respective end mass inserts 90 and the base surface 96 of the central hub insert 92. The spacers are optionally integrally formed in the respective weighted inserts 90, 92 during manufacture thereof and eliminate the need for uniformity of length among different locating pins between different injection mold dies and between different locating pins within a single die. The lengths of different projecting spacers may be more easily controlled than the depth of locating holes due to the nature of the injection molding process. Widely separating a quantity of spacers in a pattern such as a circle, rectangle or triangle furthermore eliminates any tendency of the weighted inserts 90, 92 to tip during the injection molding operation of the injection moldable plastic material 88 for forming the weighted body structure 12.

Thereafter, the weighted body structure 12 is processed as discussed herein, including overmolding with the coating 42 of soft rubber or other flexible elastomer, and subsequent breaking of the plastic material 88 portion of the legs 16 rigidly connecting the end masses 26 in a substantially coplanar relationship with the central hub 18 and constraining them from motion in the plane 62 so as to constrain the end masses 26 from conforming to such a non-planar surface.

Figure 13:
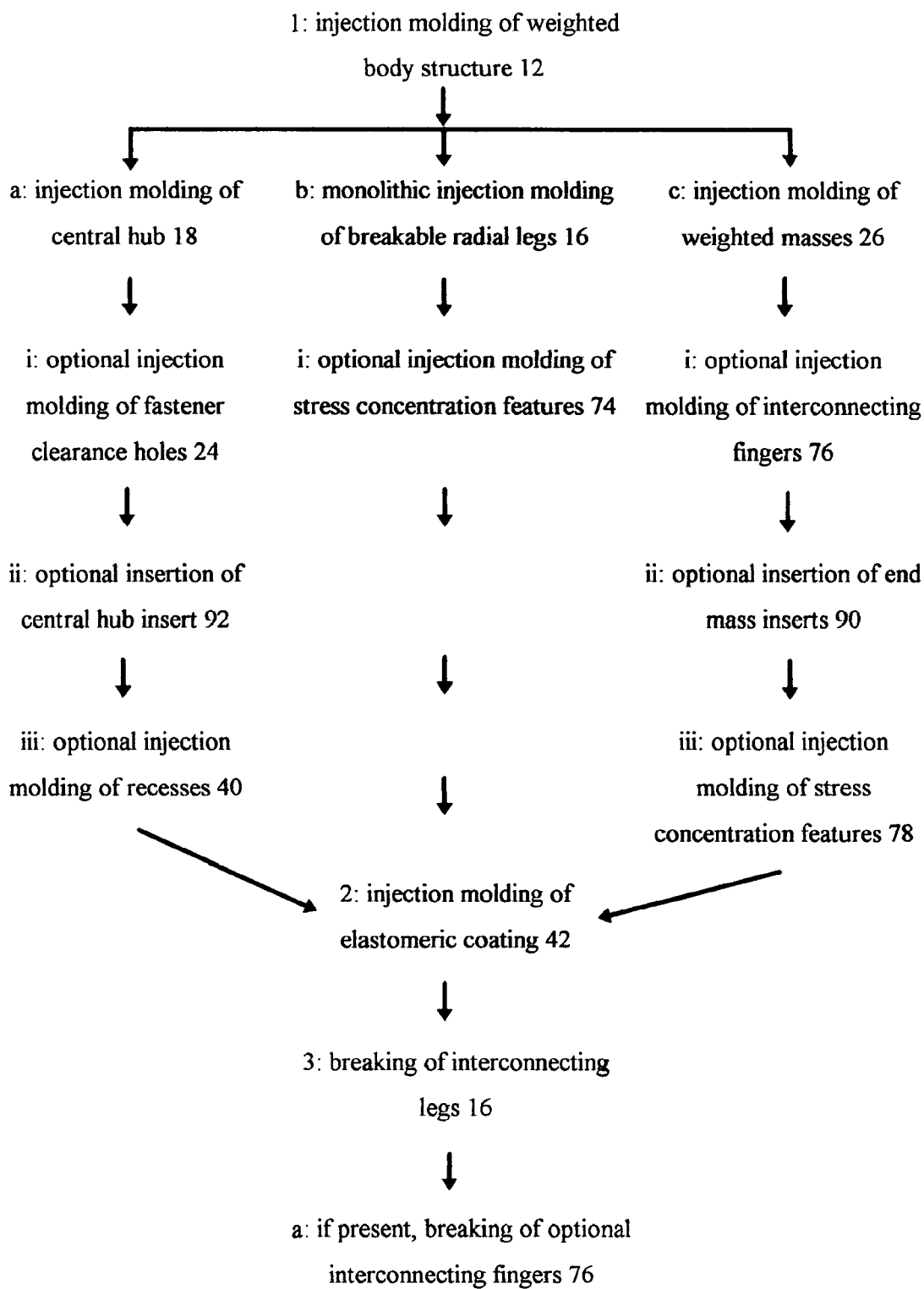
FIG. 13 illustrates by example and without limitation process steps for manufacturing the weighted mounting platform, wherein the process includes injection molding the monolithic weighted body structure.

FIG. 13 is a Table 1 that illustrates by example and without limitation process steps for manufacturing the weighted mounting platform 10, wherein the process includes injection molding the monolithic weighted body structure 12. The process steps of Table 1 are applicable to injection molding the monolithic weighted body structure 12 either of the heavy high density injection moldable material 30 being by example and without limitation a metal filled-plastic or filled-rubber material, or another high density injection moldable compound. As illustrated in Table 1, the process steps for injection molding the monolithic weighted body structure 12 further include: forming a web 14 of easily breakable spider legs 16 projected in a substantially radial web from a common large thick monolithic central hub 18, and a plurality of substantially identical monolithic lumps or masses 26 each positioned adjacent to the outer end 28 of each of the radially projected breakable spider legs 16 of the web 14 and substantially uniformly spaced at regular intervals around the central hub 18 at a substantially uniform distance 32 therefrom. Injection molding the monolithic weighted body structure 12 further includes forming the monolithic central hub 18 having a substantially planar upper mounting surface 20 and opposing base surface 36.

Injection molding the central hub 18 of the monolithic weighted body structure 12 optionally further includes forming one or a plurality of fastener clearance holes 24 in or through the central hub 18 and present on the upper mounting surface 20. Injection molding the central hub 18 of the monolithic weighted body structure 12 optionally further includes forming the recesses 40 into the base surface 36 of the central hub 18 substantially concentric with corresponding fastener clearance holes 24 to receive a head of a fastener.

When the weighted body structure 12 is injection molded of the conventional injection moldable plastic material 88, injection molding the central hub 18 optionally includes positioning the heavy central hub insert 92 within the mold and injection molding the plastic material 88 thereover, as discussed herein.

Injection molding the weighted end masses 26 of the monolithic weighted body structure 12 further includes forming the monolithic weighted end masses 26 being both significantly thicker and significantly wider than the breakable in-gate spider legs 16, and having respective base surfaces 34 by example and without limitation as being substantially coplanar with the base surface 36 of the monolithic central hub 18. Injection molding the weighted end masses 26 optionally further includes forming interconnecting fingers 76 between adjacent monolithic masses 26. When the optional interconnecting fingers 76 are present, injection molding the weighted end masses 26 optionally further includes forming one or more stress concentration features 78 therein during the injection molding process. For example, the one or more stress concentration features 78 are optionally formed by example and without limitation as shallow V-shape notches in the respective base surfaces 80 of the connecting fingers 76.

When the weighted body structure 12 is injection molded of the conventional injection moldable plastic material 88, injection molding the end masses 26 includes positioning the heavy end mass inserts 90 within the mold and injection molding the plastic material 88 thereover, as discussed herein.

Injection molding the web 14 of legs 16 interconnecting the respective weighted end masses 26 of the monolithic weighted body structure 12 with the central hub 18 optionally further includes forming the base surfaces 38 thereof being substantially coplanar with the base surfaces 34 and 36 of the respective end masses 26 and monolithic central hub 18. Else, the base surfaces 38 of the breakable legs 16 are spatially non-coplanar with the respective base surfaces 34 and 36 of the end masses 26 and central hub 18, as discussed herein. Furthermore, injection molding the web 14 of interconnecting legs 16 optionally also includes forming one or more stress concentration features 74 therein during the injection molding process. For example, the one or more stress concentration features 74 are optionally formed by example and without limitation as shallow V-shape notches in the respective base surfaces 38 of the connecting legs 16.

Manufacturing the weighted mounting platform 10 further includes forming the coating 42 of soft rubber or other flexible elastomer over a majority of the monolithic weighted body structure 12, including the entirety of the weighted end masses 26 and the respective legs 16 connecting them to the central hub 18. Base and side surface portions 36 and 22 of the central hub 18 are also overmolded with the coating 42 exclusive of the small apertures 52 therethrough for exposing the recesses 40, as well as the peripheral lip portion 54 of the substantially planar upper mounting surface 20 exclusive of the inner central portion 56.

Subsequently, with the overmolded coating 42 in place over the weighted body structure 12, the legs 16 connecting the respective weighted end masses 26 to the central hub 18, and the optional interconnecting fingers 76, when present, are fractured or broken for freeing the end masses 26 for independent flexible motion at least within the plane 62 substantially perpendicular of the respective base surfaces 34 and 36 of the end masses 26 and central hub 18.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A method for manufacturing a weighted mounting platform, the method comprising: forming a body structure of an injection moldable material, the forming a body structure further comprising forming a hub with a plurality of legs projecting therefrom and an enlarged mass positioned adjacent to an end portion of one or more of the legs distal from the hub; substantially covering at least a portion of the body structure between the enlarged mass and the hub with a flexible skin of an injection moldable material; and further comprising, subsequent to the substantially covering at least a portion of the body structure between the enlarged mass and the hub with a flexible skin of an injection moldable material, intentionally breaking one or more of the plurality of legs within respective portions of the flexible skin of elastomeric material.

2. The method of claim 1, wherein forming a body structure of an injection moldable material further comprises injection molding the body structure of the injection moldable material.

3. The method of claim 2, wherein forming a body structure of an injection moldable material further comprises forming a body structure of a high density injection moldable material.

4. The method of claim 3, wherein forming a body structure of a high density injection moldable material further comprises forming a body structure of a metal filled injection moldable plastic material.

5. The method of claim 3, wherein the substantially covering at least a portion of the body structure between the enlarged mass and the hub with a flexible skin of an injection moldable material further comprises covering the at least a portion of the body structure with a flexible skin of an elastomeric injection moldable material different flora the high density injection moldable material.

6. The method of claim 2, wherein the forming a body structure of an injection moldable material further comprises: forming a substantially rigid body structure of an injection moldable plastic material; fixing a leg end insert of heavy material at a position corresponding to the enlarged mass adjacent to the end portion of one or more of the legs distal from the hub; and injection molding the injection moldable plastic material at least partially around the leg end insert; and the substantially covering at least a portion of the body structure between the enlarged mass and the hub with a flexible skin of an injection moldable material further comprises injection molding an elastomeric injection moldable material over the at least a portion of the body structure between the enlarged mass and the hub.

7. The method of claim 3, wherein the substantially covering at least a portion of the body structure between the enlarged mass and the hub with a flexible skin of an injection moldable material further comprises injection molding an elastomeric injection moldable material over the at least a portion of the body structure between the enlarged mass and the hub.

8. The method of claim 6, wherein the fixing an insert of heavy material at a position corresponding to the enlarged mass adjacent to the end portion of one or more of the legs distal from the hub further comprises fixing a monolithic insert of heavy material at a position corresponding to the enlarged mass adjacent to the end portion of one or more of the legs distal from the hub.

9. The method of claim 7, wherein the fixing an insert of heavy material at a position corresponding to the enlarged mass adjacent to the end portion of one or more of the legs distal from the hub further comprises fixing a plurality of inserts of heavy material at a position corresponding to the enlarged mass adjacent to the end portion of one or more of the legs distal from the hub.

10. The method of claim 6, wherein the forming a body structure of an injection moldable material further comprises: fixing a hub insert of heavy material at a position corresponding to the hub; and injection molding the injection moldable material at least partially around the hub insert.

11. A method for manufacturing a weighted mounting platform, the method comprising: of a first injection moldable material, injection molding a substantially rigid body structure further comprising a substantially central hub with a plurality of legs projecting therefrom and an enlarged mass positioned adjacent to an end portion of at least two or more of the plurality of legs distal from the hub; of a second injection moldable material, injection molding a flexible skin covering at least a portion of the body structure between each enlarged mass and the central hub; and subsequent to the injection molding a flexible skin, freeing the enlarged mass positioned adjacent to an end portion of at least two or more of the plurality of legs for motion relative to the central hub by intentionally breaking one or more of the plurality of legs within respective portions of the flexible skin of elastomeric material.

12. The method of claim 11, wherein the injection molding a substantially rigid body structure of a first injection moldable material further comprises injection molding the substantially rigid body structure of a metal filled injection moldable plastic material.

13. The method of claim 11, wherein the injection molding a substantially rigid body structure further comprises: fixing a leg end insert of heavy material at a position corresponding to the enlarged mass positioned adjacent to an end portion of at least two or more of the plurality of legs distal from 5 the hub; and injection molding the first injection moldable material at least partially around the leg end insert.

14. The method of claim 13, wherein the injection molding a flexible skin covering at least a portion of the body structure between each enlarged mass and the central hub further 10 comprises injection molding a flexible skin coveting over substantially all of the body structure except for a central portion of the hub.

15. The method of claim 14, wherein the injection molding a substantially rigid body structure further comprises: fixing a hub insert of heavy material at a position corresponding to the hub; and injection molding the first injection moldable material at least partially around the hub insert.

16. A method for manufacturing a weighted mounting platform, the method comprising: of a first injection moldable plastic material, injection molding a substantially rigid body structure further comprising a substantially central hub with a plurality of legs projecting substantially radially therefrom and an enlarged mass positioned adjacent to an end portion of each of the plurality of legs distal from the hub, the enlarged masses each further comprising a base surface thereof substantially coplanar with a base surface of the central hub; at least partially encasing a heavy mass within each of the enlarged masses; of a second injection moldable material, injection molding a substantially integral flexible sheath covering at least a portion of each of the enlarged masses of the body structure, each of the plurality of legs between each enlarged mass and the central hub, and at least a base and side portions of the central hub; subsequent to the injection molding the flexible sheath, intentionally breaking at least two or more of the plurality of legs within the flexible sheath.

17. The method of claim 16, wherein the heavy mass within each of the enlarged masses further comprises one of a singular monolithic heavy mass and a conglomeration of heavy masses.

18. The method of claim 17, wherein the injection molding a substantially rigid body structure further comprises at least partially encasing a heavy mass within the central hub.

* * * * *